United States Patent
Wampler et al.

(10) Patent No.: US 10,072,154 B2
(45) Date of Patent: Sep. 11, 2018

(54) LOW HYSTERESIS CARBON BLACK

(71) Applicant: Sid Richardson Carbon, Ltd., Fort Worth, TX (US)

(72) Inventors: Wesley Wampler, Hudson Oaks, TX (US); Leszek Nikiel, Fort Worth, TX (US); Kalyan K. Das, Borger, TX (US)

(73) Assignee: Sid Richardson Carbon, Ltd., Fort Worth, TX (US)

( * ) Notice: Subject to any disclaimer, the term of this patent is extended or adjusted under 35 U.S.C. 154(b) by 123 days.

(21) Appl. No.: 15/050,966

(22) Filed: Feb. 23, 2016

(65) Prior Publication Data

US 2016/0251518 A1 Sep. 1, 2016

Related U.S. Application Data

(60) Provisional application No. 62/120,958, filed on Feb. 26, 2015.

(51) Int. Cl.
*C09C 1/48* (2006.01)
*C09C 1/50* (2006.01)
(Continued)

(52) U.S. Cl.
CPC ............. *C09C 1/48* (2013.01); *B60C 1/00* (2013.01); *B60C 1/0016* (2013.01); *B60C 1/0025* (2013.01); *C08K 3/04* (2013.01); *C09C 1/50* (2013.01); *B60C 2001/0066* (2013.01); *C01P 2004/64* (2013.01); *C01P 2006/12* (2013.01); *C01P 2006/19* (2013.01); *C08K 2201/006* (2013.01); *Y02T 10/862* (2013.01)

(58) Field of Classification Search
CPC .... C09C 1/48; C09C 1/50; B60C 1/00; B60C 1/0016; B60C 1/0025; B60C 2001/0066; C08K 3/04; C08K 2201/006; C01P 2004/64; C01P 2006/12; C01P 2006/19
USPC .......................................................... 524/495
See application file for complete search history.

(56) References Cited

U.S. PATENT DOCUMENTS 5,321,072 A † 6/1994 Misono
6,403,695 B1 † 6/2002 Soeda
(Continued)

FOREIGN PATENT DOCUMENTS

| KR | 20120058298 A | * | 6/2012 |
| KR | 1020120058298 A | † | 4/2014 |
| WO | 2015161950 A1 | | 10/2015 |

OTHER PUBLICATIONS

KR 2012-0058298A—machine translation.*
(Continued)

*Primary Examiner* — Ling Siu Choi
*Assistant Examiner* — Ronald Grinsted
(74) *Attorney, Agent, or Firm* — Jacob M. Ward; Ward Law Office LLC

(57) ABSTRACT

A carbon black product comprises aggregates of carbon black characterized as having an OAN of between 139 and 149 ml/100 g, a COAN of between 95 and 105 ml/100 g, an iodine adsorption number $I_2$ No of between 52 and 62 mg/g, and a multipoint nitrogen adsorption $N_2SA$ of between 54 and 64 $m^2/g$. Tires manufactured with the carbon black product exhibit low rolling resistance and low heat build-up under service conditions.

11 Claims, 7 Drawing Sheets

(51) Int. Cl.
*B60C 1/00* (2006.01)
*C08K 3/04* (2006.01)

(56) References Cited

U.S. PATENT DOCUMENTS

| 7,884,156 | B2 | 2/2011 | Arnold |
| 2003/0013797 | A1 † | 1/2003 | Thielen |
| 2004/0092647 | A1 † | 5/2004 | Chauvin |
| 2010/0163151 | A1 † | 7/2010 | Ishida |
| 2012/0259051 | A1 † | 10/2012 | Miyazaki |
| 2015/0298511 | A1 † | 10/2015 | Kameda |

OTHER PUBLICATIONS

Annual Book of Standards 2016, Section 9 Rubber, vol. 09.01 Rubber, Natural and Synthetic-General Test Methods; Carbon Black, ISBN 978-1-6220-4917-2, ISSN 0192-2998, ASTM Stock No. S090116, pp. 306-315, 458-465, 604-609, 822-825, 1120-1125.†

* cited by examiner
† cited by third party

LOW HYSTERESIS CARBON BLACK

CROSS-REFERENCE TO RELATED APPLICATIONS

This application claims the benefit of U.S. Provisional Application No. 62/120,958, filed on Feb. 26, 2015. The entire disclosure of the aforementioned application is hereby incorporated herein by reference.

FIELD

The present disclosure relates to carbon black and, more particularly, to carbon black useful in elastomer compositions for tires and their components.

BACKGROUND

Carbon blacks are one of the darkest and most finely divided materials known. Chemically, carbon blacks are a colloidal form of elemental carbon consisting of 95 to 99 percent carbon. Carbon blacks are widely used as pigments, fillers and reinforcing agents in the compounding and preparation of rubber and other elastomeric compounds, and particularly in the preparation of elastomeric compounds used in the manufacturing of tires.

A furnace-type reactor produces carbon black by pyrolyzing a hydrocarbon feedstock with hot combustion gases. Made in specially designed reactors operating at internal temperatures in the range of 1425° C. to 2000° C., different grades of carbon black can be produced with varying aggregate size and structure. The pyrolysis combustion products include particulate aggregates of carbon black particles. Carbon blacks are generally characterized on the basis of their physical characteristics, including, but not limited to: particle size and specific surface area; aggregate size, shape and distribution; and chemical and physical properties of the surface.

Carbon blacks are classified according to a standard classification system provided under ASTM designation D1765. In accordance with this standard, rubber grade carbon blacks are classified using a four-character nomenclature: the first character gives an indication of the influence of the carbon black on the rate of cure of a typical rubber compound containing the carbon black; the second character, the group number, gives information on the average surface area of the carbon black and the last two characters are assigned arbitrarily.

Thus, for example, an N347 carbon back describes, with the "N," a carbon black that has a normal effect on the cure rate (slow curing rate carbon blacks are denoted by "S") and, with the group number "3," indicates a carbon black having an average nitrogen surface area of between 70 and 99 $m^2/g$. Another example is an N110 carbon black, with the first digit "N" denoting normal curing rate, and the group number "1" signifying particle size of the carbon black in milimicron (all the carbon blacks having particle size as 11 milimicrons to 19 milimicrons are classified as 1).

In the manufacturing of tires, carbon blacks are selected for use in the tires based upon the preferred characteristics of the rubber mix. Carbon blacks denoted by 1, 2 and 3 as particle size are categorized as "tread black", and 5, 6 and 7 as particle size are categorized as "carcass black". For example, a truck tire tread may be manufactured from a rubber mix containing a carbon black having the physical properties of a rubber black assigned to the N200 classification series. By contrast, the carcass of the tire may be manufactured from a rubber mix containing a carbon black having the physical properties of the N600 carbon black classification series. Such selections are made based upon the known effects that different classes of carbon black have on the physical properties of the rubber such as, for example, the hysteresis and rigidity of the compound.

As of this time, ASTM does not categorize any carbon black as group number "4" according to particle size. Thus, any special carbon black produced in this surface area range is known as "gap black". These carbon blacks are characterized by having properties of both tread and carcass blacks.

There is a continuing need for a carbon black product that is a gap black, and which exhibits low rolling resistance and low heat build-up under service conditions when incorporated into rubber compositions for tires.

SUMMARY

In concordance with the instant disclosure, a carbon black product that is a gap black, and which exhibits low rolling resistance and low heat build-up under service conditions when incorporated into rubber compositions for tires, is surprisingly discovered. Due to low rolling resistance, tires made with the carbon black product of the present disclosure offer better fuel efficiency compared to conventional tires.

In one embodiment, a carbon black product includes aggregates of carbon black characterized as having an OAN of between 139 and 149 ml/100 g, a COAN of between 95 and 105 ml/100 g, an iodine adsorption number $I_2$ No of between 52 and 62 mg/g, and a multipoint nitrogen adsorption $N_2SA$ of between 54 and 64 $m^2/g$.

In another embodiment, a polymer formulation includes a quantity of polymer, and a quantity of the carbon black product including aggregates of carbon black characterized as having an OAN of between 139 and 149 ml/100 g, a COAN of between 95 and 105 ml/100 g, an iodine adsorption number $I_2$ No of between 52 and 62 mg/g, and a multipoint nitrogen adsorption $N_2SA$ of between 54 and 64 $m^2/g$.

Cured rubber products such as tires having the carbon black product are also disclosed.

In yet another embodiment, a method for determining polymer-filler interaction of a carbon black includes a stop of determining a bound rubber content of a plurality of polymer formulations including the carbon black at different loadings. A scatter plot of the bound rubber content of the plurality of polymer formulations is then charted relative to one of total carbon black surface and total carbon black mass. A best fit line is generated on the scatter plot. A slope of the best fit line is then calculated. A numerical value of the slope is a polymer interaction coefficient (PIC) indicative of the polymer-filler interaction.

DRAWINGS

The above, as well as other advantages of the present disclosure, will become readily apparent to those skilled in the art from the following detailed description, particularly when considered in the light of the drawings described hereafter.

Figure 8:
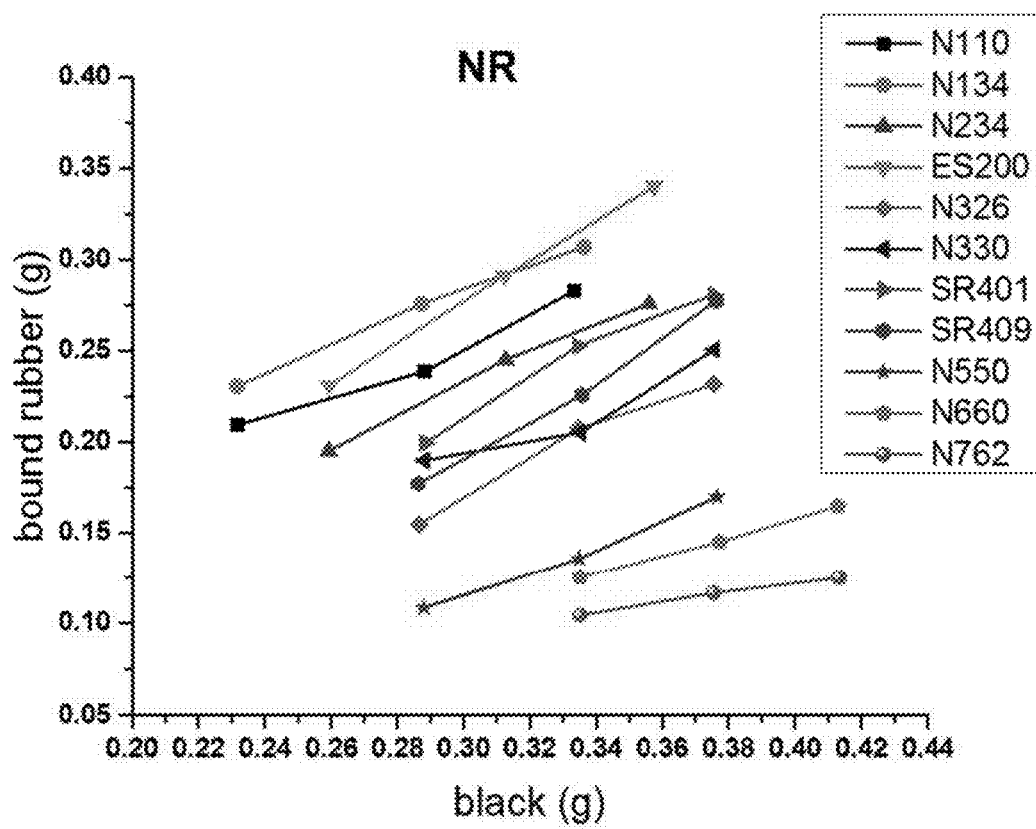
Figure 9:
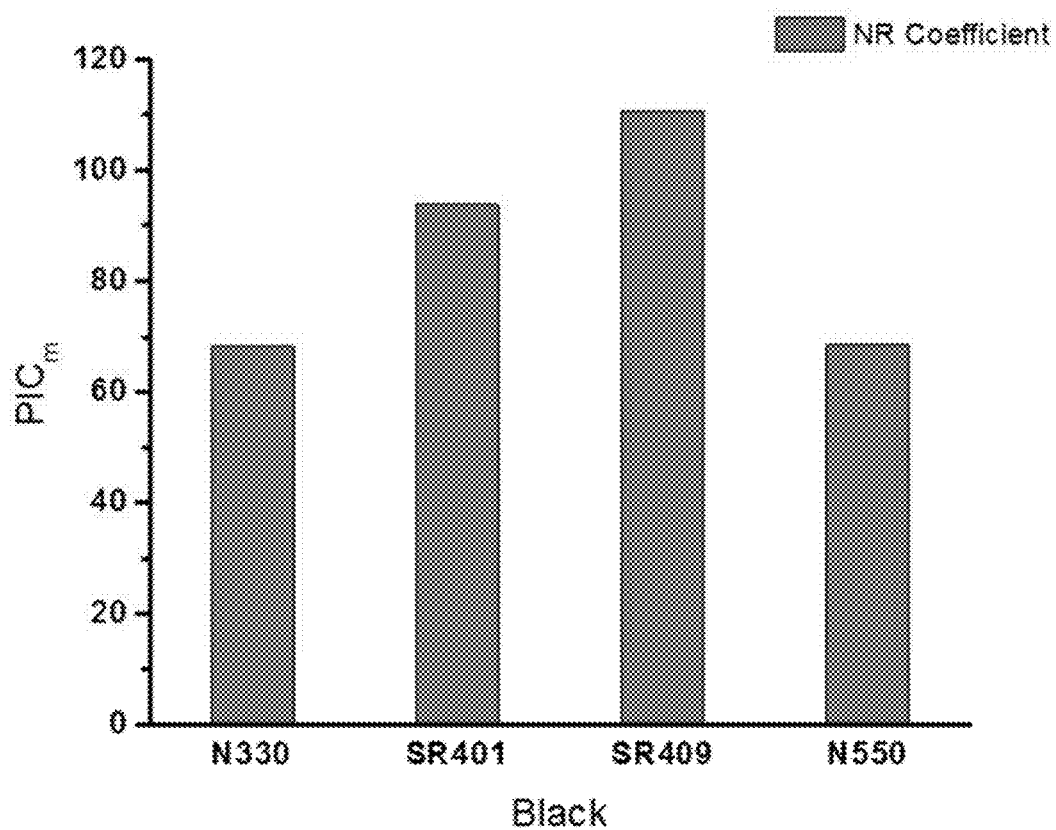

FIG. 8 is a chart showing the plots of mass of bound rubber against a total mass of the carbon black for a multitude of carbon black types, including the carbon black product according to the present disclosure; and FIG. 9 is bar graph showing a greater polymer interaction coefficient mass effect for the carbon black product according to the present disclosure, which is indicative of a superior polymer-filler interaction.

DETAILED DESCRIPTION

The following description is merely exemplary in nature and is not intended to limit the present disclosure, application, or uses. It should also be understood that throughout the drawings, corresponding reference numerals indicate like or corresponding parts and features. In respect of the methods disclosed, the order of the steps presented is exemplary in nature, and thus, is not necessary or critical unless otherwise disclosed.

The present disclosure includes a carbon black product. The carbon black product includes particles of carbon black characterized as having an OAN of between 139 and 149 ml/100 g, a COAN of between 95 and 105 ml/100 g, an iodine adsorption number $I_2$ number of between 52 and 62 mg/g, a multipoint nitrogen adsorption $N_2SA$ of between 54 and 64 m2/g, and a tint of between 72 and 84.

Oil absorption number (OAN) is the number of cubic centimeters of dibutyl phthalate (DBP) or paraffin oil absorbed by 100 g of carbon black under specified conditions. The OAN value is proportional to the degree of aggregation of structure level of the carbon black. See ASTM Test Methods D2414 and D3493.

Oil absorption number of compressed sample (COAN) is the number of cubic centimeters of dibutyl phthalate (DBP) or paraffin oil absorbed by 100 g of carbon black after being compressed four times in a compression cylinder at 165 MPa (24,000 psi) under specified conditions. The COAN value gives some measure of the stability of the structure of the carbon black. See ASTM Test Methods D2414 and D3493.

The iodine adsorption number ($I_2$ No) is the number of grams of iodine adsorbed per kilogram of carbon black under specified conditions. See ASTM Test Method D1510.

The nitrogen surface area ($N_2SA$) is the total surface area of carbon black that is calculated from nitrogen adsorption data using the B.E.T. theory. See ASTM Test Methods D3037 and D4820.

Tint strength is the ratio, expressed as tint units, of the reflectance of a standard paste to a sample paste, both prepared and tested under specified conditions. See ASTM Test Method D3265.

Toluene discoloration is the transmittance, at 425 nm, of the filtrate obtained from the toluene extract of carbon black, compared with that of pure toluene. See ASTM Test Method D1618.

The present disclosure also includes a polymer formulation having a quantity of polymer, such as a rubber or a plastic, and a quantity of the carbon black product. As nonlimiting examples, the polymer may include one of styrene butadiene rubber, butadiene rubber, natural rubber, polyisoprene rubber, butyl rubber, and combinations thereof. The particles of the carbon black product may be substantially evenly distributed throughout the polymer, for example, by a mixing operation prior to an extrusion or molding operation. It should be understood that the substantially even distribution of the carbon black product throughout the polymer may be facilitated by a thorough mixing operation, and that the ability to perform such mixing operations is possessed by of one of ordinary skill in the art.

Where the polymer formulation includes rubber, the formulation can be compounded by methods known in the rubber compounding art, such as mixing various sulfur-vulcanizable constituent polymers with various commonly used additive materials as, for example, curing aids such as sulfur, activators, retarders and accelerators, processing additives such as oils, resins, for example, tackifying resins, silicas, plasticizers, fillers, pigments, fatty acid, zinc oxide, waxes, antioxidants and antiozonants, peptizing agents, and reinforcing materials such as, for example, carbon black, and the like. Other suitable additives for rubber formulations may also be used, as desired. Depending on the intended use of the rubber formulation, the common additives are selected and used in conventional amounts.

Other types of formulations and products without polymers, such as inks as a nonlimiting example, are also contemplated as using the carbon black product, and are likewise within the scope of the present disclosure.

The present disclosure also includes an article comprising the rubber formulation having the carbon black product. It should be appreciated that the rubber formulation having the carbon black product may be extruded, molded, or otherwise formed into a desired shape and cured through the application of at least one of heat and pressure. As a nonlimiting example, the rubber formulation may be used in a tire having a component such as a tire tread, sidewall, belt coat, or another component of the tire. Other types of articles including commercial products may also be manufactured using the rubber formulation with the carbon black product, within the scope of the disclosure.

EXPERIMENTAL

Product Evaluations:

First and second runs of the carbon black product according to the present disclosure, identified herein below as SR409, were produced for evaluation.

TABLES I-V show analytical properties and rubber data for the carbon black product as evaluated. Desirable physico-chemical properties and rubber performance parameters were achieved in these runs.

The analytical properties of the carbon black products of the invention produced during the first and second production runs are shown in TABLE I.

TABLE I

|  | First Production SR409 Sample #1 | First Production SR409 Sample #2 | Second Production SR409 Sample #1 | Second Production SR409 Sample #2 | Second Production SR409 Sample #3 |
| --- | --- | --- | --- | --- | --- |
| OAN | 142.6 | 145.1 | 143.6 | 139.6 | 136.2 |
| COAN | 97.9 | 98.1 | 97.5 | 98 | 97.5 |
| Iodine | 55.6 | 57.1 | 50.5 | 51.7 | 53.9 |
| N2SA | 58.2 | 59 | 55.2 | 55.9 | 55.9 |
| STSA | 55.9 | 56.7 | 52.6 | 53.3 | 53.5 |
| Tint | 82.7 | 82.9 | 83.6 | 84.5 | 85.1 |

Advantageously, the OAN for the SR409 carbon black product was lower compared to the typically OAN for commercially available SR401 carbon black, whereas COAN measurements were at a similar level as typical SR401 carbon black.

The carbon black of the present disclosure was also incorporated by conventional mixing practices into ASTM standard rubber formulations, which were subsequently tested as shown in the following TABLES II-V.

In TABLE II, rubber data in SBR formulation (ASTM D3191) was obtained for the carbon black of the invention produced during the first production run, compared to sample of commercially SR401 carbon black, also described in U.S. Pat. No. 7,884,156 to Arnold.

TABLE II

|  | ASTM D3191 Sample of SR401 SR401 Control | ASTM D3191 First Production SR409 Sample #1 | ASTM D3191 First Production SR409 Sample #2 |
| --- | --- | --- | --- |
| Stress-Strain, ASTM D412 | | | |
| 100% Modulus, MPa | 4.6 | 4.1 | 4 |
| 200% Modulus, MPa | 12.7 | 11.3 | 11.2 |
| 300% Modulus, MPa | 20.8 | 19.1 | 18.8 |
| Tensile, MPa | 24.1 | 24.3 | 25.2 |
| Elongation, % | 349 | 384 | 407 |
| Durometer | 75 | 76 | 75 |
| Goodyear-Healey Rebound, 23° C. | 58.7 | 59.5 | 59.9 |
| MDR Cure @ 160° C. | | | |
| ML, d · Nm | 3.28 | 3.04 | 3.05 |
| MH, d · Nm | 21.53 | 20.37 | 20.34 |
| ts1, min. | 3.31 | 3.35 | 3.22 |
| ts2, min. | 4.33 | 4.54 | 4.35 |
| t'10, min. | 4.21 | 4.3 | 4.12 |
| t'25, min. | 5.42 | 5.68 | 5.45 |
| t'50, min. | 7.04 | 7.38 | 7.14 |
| t'75, min. | 9.47 | 9.89 | 9.63 |
| t'90, min. | 12.68 | 13.18 | 12.87 |
| Mooney Viscosity @ 100° C. | 85.2 | 82.9 | 82.7 |
| Mooney Scorch @ 135° C. | | | |
| Minimum Viscosity | 56 | 56.4 | 56.3 |
| t'5, min. | 18.48 | 18.58 | 17.73 |
| t'35, min. | 25.02 | 25.45 | 24.34 |
| Rheometrics SS @ 60° C. | | | |
| G' max. MPa | 3.888 | 3.45 | 3.474 |
| G" max. MPa | 0.625 | 0.539 | 0.543 |
| Tan δ max. | 0.197 | 0.192 | 0.19 |

In TABLE III, rubber data in Natural Rubber formulation (ASTM D3192) was obtained for the carbon black of the invention produced during the first production run, compared to sample of SR401 carbon black.

TABLE III

|  | ASTM D3192 Sample of SR401 SR401 Control | ASTM D3192 First Production SR409 Sample #1 | ASTM D3192 First Production SR409 Sample #2 |
| --- | --- | --- | --- |
| Stress-Strain, ASTM D412 | | | |
| 100% Modulus, MPa | 4.4 | 4.2 | 4.3 |
| 200% Modulus, MPa | 10.4 | 10.3 | 10.3 |
| 300% Modulus, MPa | 16.6 | 16.5 | 16.2 |
| Tensile, MPa | 23.3 | 25.2 | 24.5 |
| Elongation, % | 416 | 458 | 455 |
| Durometer | 74 | 74 | 73 |
| Goodyear-Healey Rebound, 23° C. | 65 | 67.2 | 66.8 |
| MDR Cure @ 160° C. | | | |
| ML, d · Nm | 2.95 | 2.75 | 2.72 |
| MH, d · Nm | 16.52 | 17.13 | 17.36 |
| ts1, min. | 1.07 | 1.04 | 1.02 |
| ts2, min. | 1.29 | 1.24 | 1.21 |
| t'10, min. | 1.16 | 1.14 | 1.11 |
| t'25, min. | 1.53 | 1.48 | 1.46 |
| t'50, min. | 2.57 | 2.52 | 2.59 |
| t'75, min. | 5.12 | 4.96 | 5.05 |
| t'90, min. | 8.37 | 7.95 | 8.05 |
| Mooney Viscosity @ 100° C. | 91.6 | 85.5 | 85.6 |
| Mooney Scorch @ 121° C. | | | |
| Minimum Viscosity | 270.3 | 65.2 | 64.7 |
| t'5, min. | 11.73 | 10.85 | 10.93 |
| t'35, min. | 14.25 | 13.22 | 13.25 |
| Rheometrics SS @ 60° C. | | | |
| G' max. MPa | 26.414 | 5.409 | 5.935 |
| G" max. MPa | 0.895 | 0.69 | 0.811 |
| Tan δ max. | 0.218 | 0.194 | 0.209 |

In TABLE IV, rubber data in SBR formulation (ASTM D3191) obtained for the carbon black of the invention produced during the second production run, compared to sample of SR401 carbon black.

TABLE IV

|  | ASTM D3191 Sample of SR401 SR401 Control | ASTM D3191 Second Production SR409 Sample #1 | ASTM D3191 Second Production SR409 Sample #2 | ASTM D3191 Second Production SR409 Sample #3 |
| --- | --- | --- | --- | --- |
| Stress-Strain, ASTM D412 | | | | |
| 100% Modulus, MPa | 4.6 | 3.9 | 4.1 | 3.8 |
| 200% Modulus, MPa | 12.8 | 11 | 11.3 | 10.6 |
| 300% Modulus, MPa | 20.8 | 18.6 | 18.8 | 18 |
| Tensile, MPa | 26 | 25.4 | 25.1 | 24.5 |
| Elongation, % | 384 | 411 | 407 | 410 |
| Durometer | 75 | 74 | 75 | 74 |
| Rebound, 23° C. | 58.9 | 59.2 | 59.3 | 59.2 |
| MDR Cure @ 160° C. | | | | |
| ML, d · Nm | 3.12 | 2.87 | 2.97 | 2.86 |
| MH, d · Nm | 22.17 | 20.7 | 20.48 | 20.36 |
| ts1, min. | 2.35 | 2.83 | 2.98 | 2.94 |
| ts2, min. | 3.58 | 4.13 | 4.14 | 4.15 |
| t'10, min. | 3.5 | 3.93 | 3.92 | 3.91 |
| t'25, min. | 5.11 | 5.47 | 5.39 | 5.46 |

TABLE IV-continued

|  | ASTM D3191 Sample of SR401 SR401 Control | ASTM D3191 Second Production SR409 Sample #1 | ASTM D3191 Second Production SR409 Sample #2 | ASTM D3191 Second Production SR409 Sample #3 |
|---|---|---|---|---|
| t'50, min. | 7.32 | 7.52 | 7.43 | 7.57 |
| t'75, min. | 10.7 | 10.59 | 10.44 | 10.7 |
| t'90, min. | 15.21 | 14.52 | 14.24 | 14.62 |
| Mooney @ 100° C. | 88.4 | 83 | 83.2 | 82.4 |
| Mooney Scorch @ 135° C. | | | | |
| Minimum Viscosity | 59.8 | 56.8 | 56.9 | 56.2 |
| t'5, min. | 17.03 | 17.75 | 17.78 | 18.25 |
| t'35, min. | 23.58 | 24.23 | 24.53 | 25.03 |
| Rheometrics SS @ 60° C. | | | | |
| G' max, MPa | 3.921 | 3.273 | 3.34 | 3.138 |
| G" max, MPa | 0.597 | 0.508 | 0.511 | 0.487 |
| Tan δ max. | 0.192 | 0.182 | 0.183 | 0.186 |

In TABLE V, rubber data in Natural Rubber formulation (ASTM D3192) was obtained for the carbon black of the invention produced during the second production run, compared to sample of SR401 carbon black.

TABLE V

|  | ASTM D3192 Sample of SR401 SR401 Control | ASTM D3192 Second Production SR409 Sample #1 | ASTM D3192 Second Production SR409 Sample #2 | ASTM D3192 Second Production SR409 Sample #3 |
|---|---|---|---|---|
| Stress-Strain, ASTM D412 | | | | |
| 100% Modulus, MPa | 4.6 | 4.2 | 4.2 | 4 |
| 200% Modulus, MPa | 11.3 | 10.3 | 10.4 | 9.9 |
| 300% Modulus, MPa | 17.8 | 16.7 | 16.7 | 16.1 |
| Tensile, MPa | 23.3 | 24.5 | 24.6 | 24.5 |
| Elongation, % | 393 | 434 | 432 | 447 |
| Durometer | 73 | 72 | 73 | 72 |
| Rebound, 23° C. | 64.9 | 67.3 | 67 | 66.2 |
| MDR Cure @ 160° C. | | | | |
| ML, d · Nm | 2.95 | 2.91 | 2.62 | 2.88 |
| MH, d · Nm | 18.45 | 17.42 | 17.19 | 17.22 |
| ts1, min. | 0.86 | 0.91 | 0.9 | 0.96 |
| ts2, min. | 1.06 | 1.11 | 1.09 | 1.18 |
| t'10, min. | 0.98 | 1.01 | 1 | 1.07 |
| t'25, min. | 1.34 | 1.38 | 1.37 | 1.45 |
| t'50, min. | 2.54 | 2.6 | 2.63 | 2.67 |
| t'75, min. | 4.82 | 5.07 | 4.93 | 5.09 |
| t'90, min. | 7.51 | 8.08 | 7.67 | 7.96 |
| Mooney @ 100° C. | 90.2 | 85.1 | 87.8 | 88 |
| Mooney Scorch @ 121° C. | | | | |
| Minimum Viscosity | 73.7 | 69 | 71.1 | 71.3 |
| t'5, min. | 9.37 | 9.67 | 9.88 | 10.41 |
| t'35, min. | 11.83 | 12.35 | 12.55 | 13.13 |
| Rheometrics SS @ 60° C. | | | | |
| G' max, MPa | 6.828 | 5.515 | 5.913 | 5.224 |
| G" max, MPa | 0.838 | 0.651 | 0.722 | 0.627 |
| Tan δ max. | 0.197 | 0.183 | 0.188 | 0.18 |

SR409 was tested for hysteresis when compounded in rubber formulations, in comparison to commercially available SR401 carbon black. Surprisingly, the SR409 has been shown to provide superior hysteresis properties compared to commercially available SR401, as measured by rebound and rheometry ($G''_{MAX}$ and Tan δ), even though the COAN measurements are similar.

Figure 1:
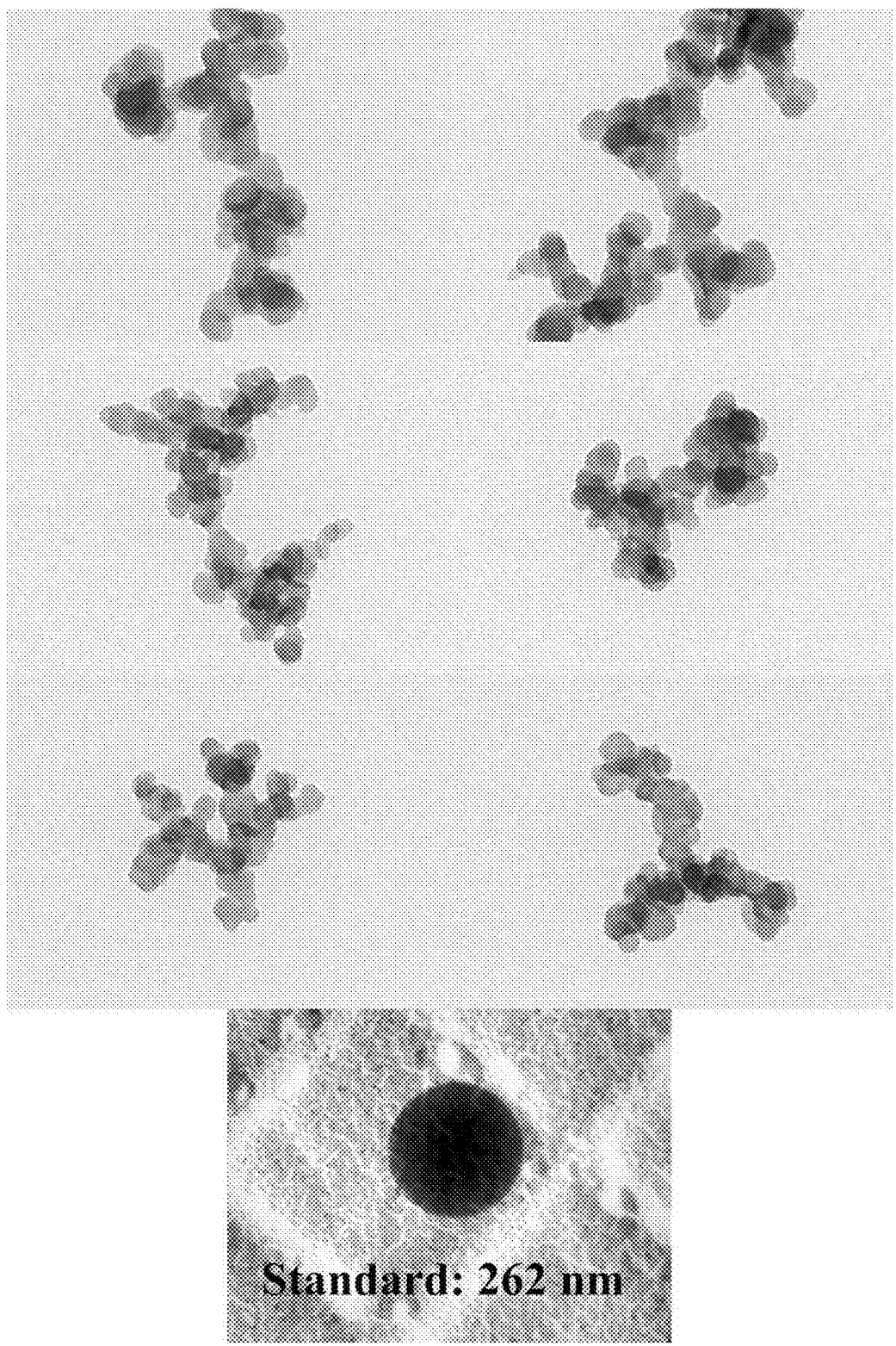
FIG. 1 shows TEM images of the carbon black product of the present disclosure.
Figure 2:
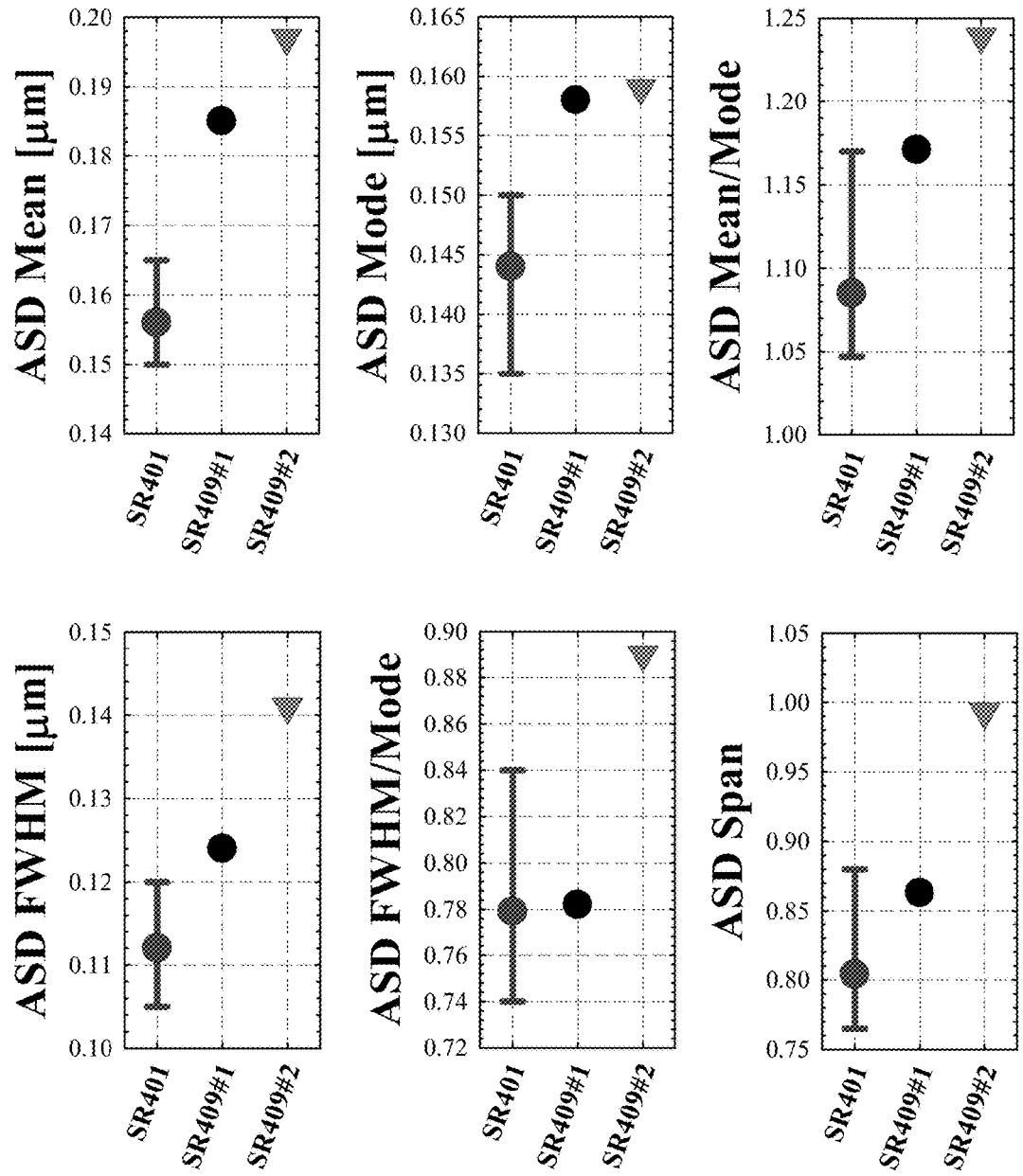
FIG. 2 shows ASD Mean and FWHM aggregate size parameters obtained for the carbon black product of the present disclosure, relative to commercially available SR401 carbon black.

With reference to FIGS. 1-2, particle size for the runs of the SR409 carbon black product measured by TEM was determined to be around 40 nm, the same as for SR401. In FIG. 2, the aggregate size parameters obtained for SR409 were compared to SR401. The "error bars" represent the spread of values observed for SR401. Aggregates of SR409 were significantly larger and more branched than observed for SR401, as shown in FIG. 2.

Without being bound by any particular theory, it is believed that the aggregates of the carbon black product of the disclosure are much larger and more branched in comparison to commercially available SR401 carbon black, resulting in the superior hysteresis properties when the carbon black product is compounded in a polymer formulation. This result is unexpected as lower structure typically gives smaller aggregates.

Polymer Interaction Coefficient (PIC):

It was also hypothesized that the improvement in performance from SR409 was due to increased polymer-filler interaction. In testing, it was observed that the SR409 gave higher bound rubber, but it was further observed that the SR409 bound rubber improvements were more enhanced at higher loadings of SR409. Thus a new test method was developed to measure this effect. This test method is called the polymer interaction coefficient (PIC), and is described further herein.

In general, the term "particle" as used herein refers to a unit of carbon black having an average diameter of 20 nanometers to 100 nanometers. The carbon black product does not exist as discrete particles, but instead involves a multitude of connected particles. The term "aggregate" as used herein refers to a connected set of particles having an average length of 200 nanometers to 1 micrometer. The aggregate is the smallest dispersible unit of carbon black in polymer. The term "agglomerate" as used herein refers to a set of percolated aggregates.

The surface of an aggregate of carbon black typically involves covalently bonded carbon with few reactive species. The surface comprises graphitic planes, amorphous carbon, crystallite edges, and slit shaped cavities. Polymer-filler interaction pf the carbon black with polymer chains is believed to be non-covalent in nature, involving physical interaction, adsorption and Van der Waals forces at these surface features. The relative energy of the amorphous carbon, which permits the interaction with the polymer chains, is greater than that of the crystallite edges, which in turn is greater than that of the slit shaped cavities.

The molecular mobility of polymer after mixing with carbon black can generally be defined by three regions of coupling. There is a region of unbound, mobile rubber, in which there is little to no carbon black surfaces available for interaction with polymer chains. There is also bound rubber in an outer shell around the carbon black aggregates, which is somewhat less mobile. Also, there is an inner shell of tightly bound rubber with very limited motion.

Traditionally, bound rubber measurements may be made by mixing carbon black and elastomer, for example, in a Haake™ laboratory batch mixer, to form a compound. The compound can be sheeted out on a mill and cut into one gram pieces for placement in a wire basket. In the wire basket, the pieces are soaked in toluene for 72 hours. The solvent is changed daily, to make sure no loose carbon black in the solvent. The pieces are then dried, and reweighed. Assuming no carbon black loss, the remaining polymer mass is calculated as follows: bound rubber=(retained rubber/original rubber)×100.

Using this traditional method of measuring bound rubber at several loadings of carbon black, the slope of bound rubber versus loading was determined and described as the PIC. The PIC concept determines changes in filler-polymer interaction, as measured by bound rubber, in various polymers with changes in carbon black loading and available carbon black surfaces.

The numerical value of the PIC can be calculated in view of mass effect or surface effect. First, a slope of $g_{BR}/g_{CB}$ provides the mass effect, which is identified further herein as the $PIC_m$. Second, the slope of $mg_{BR}/m^2$ provides the surface effect, which is identified further herein as the $PIC_s$. Comparing various polymers and various carbon black types and amounts with the PIC, in the form of either the $PIC_m$ or the $PIC_s$, is believed to allow for prediction of mechanical effects in various scenarios.

The PIC was evaluated for a variety of carbon black types, including SR409 according to the present disclosure. The initial design for the PIC evaluation is shown in TABLE VI.

TABLE VI

| Carbon black | Polymer | Loading | Mixing time |
| --- | --- | --- | --- |
| N110, N134 | S-SBR | 30, 40, 50 phr | 8 min |
|  | NR | 30, 40, 50 phr | 8 min |
|  | BR | 30, 40, 50 phr | 8 min |
|  | Tin-coupled SBR | 30, 40, 50 phr | 8 min |
|  | E-SBR | 30, 40, 50 phr | 8 min |
| N234, N299, ES200 | S-SBR | 35, 45, 55 phr | 8 min |
|  | NR | 35, 45, 55 phr | 8 min |
|  | BR | 35, 45, 55 phr | 8 min |
|  | Tin-coupled SBR | 35, 45, 55 phr | 8 min |
|  | E-SBR | 35, 45, 55 phr | 8 min |
| N326, N330, N358 | S-SBR | 40, 50, 60 phr | 8 min |
| SR401, SR409, N550 | NR | 40, 50, 60 phr | 8 min |
|  | BR | 40, 50, 60 phr | 8 min |
|  | Tin-coupled SBR | 40, 50, 60 phr | 8 min |
|  | E-SBR | 40, 50, 60 phr | 8 min |
| N660, N762 | S-SBR | 50, 60, 70 phr | 8 min |
|  | NR | 50, 60, 70 phr | 8 min |
|  | BR | 50, 60, 70 phr | 8 min |
|  | Tin-coupled SBR | 50, 60, 70 phr | 8 min |
|  | E-SBR | 50, 60, 70 phr | 8 min |

TABLE VII shows analytical properties for the carbon black product as evaluated for PIC.

TABLE VII

| Grade | N2SA | STSA | I2 No | OAN | COAN |
| --- | --- | --- | --- | --- | --- |
| N134 | 137.4 | 131.3 | 142.2 | 126.2 | 104 |
| N110 | 130.5 | 123.9 | 146.8 | 113.7 | 101.7 |
| ES200 | 119.5 | 113.8 | 119.6 | 122.4 | 102.1 |
| N234 | 117 | 111.1 | 118.2 | 124.6 | 102.4 |
| N299 | 99.2 | 95.7 | 108.2 | 120.5 | 102.3 |
| N326 | 79.2 | 79.8 | 83.2 | 71.6 | 68.7 |
| N330 | 78.3 | 77.2 | 83.3 | 100.2 | 86.1 |
| N358 | 77.4 | 75.3 | 81.4 | 148 | 106.8 |
| SR401 | 59.5 | 57 | 55.2 | 162.7 | 105 |
| SR409 | 58.2 | 56.3 | 55.1 | 143.3 | 98.8 |
| N550 | 41.6 | 40.9 | 43.3 | 119.9 | 83.5 |
| N660 | 33.8 | 33.3 | 35.2 | 89.7 | 74.9 |
| N762 | 29.5 | 28.7 | 28.2 | 63.5 | 55.3 |

Figure 3:
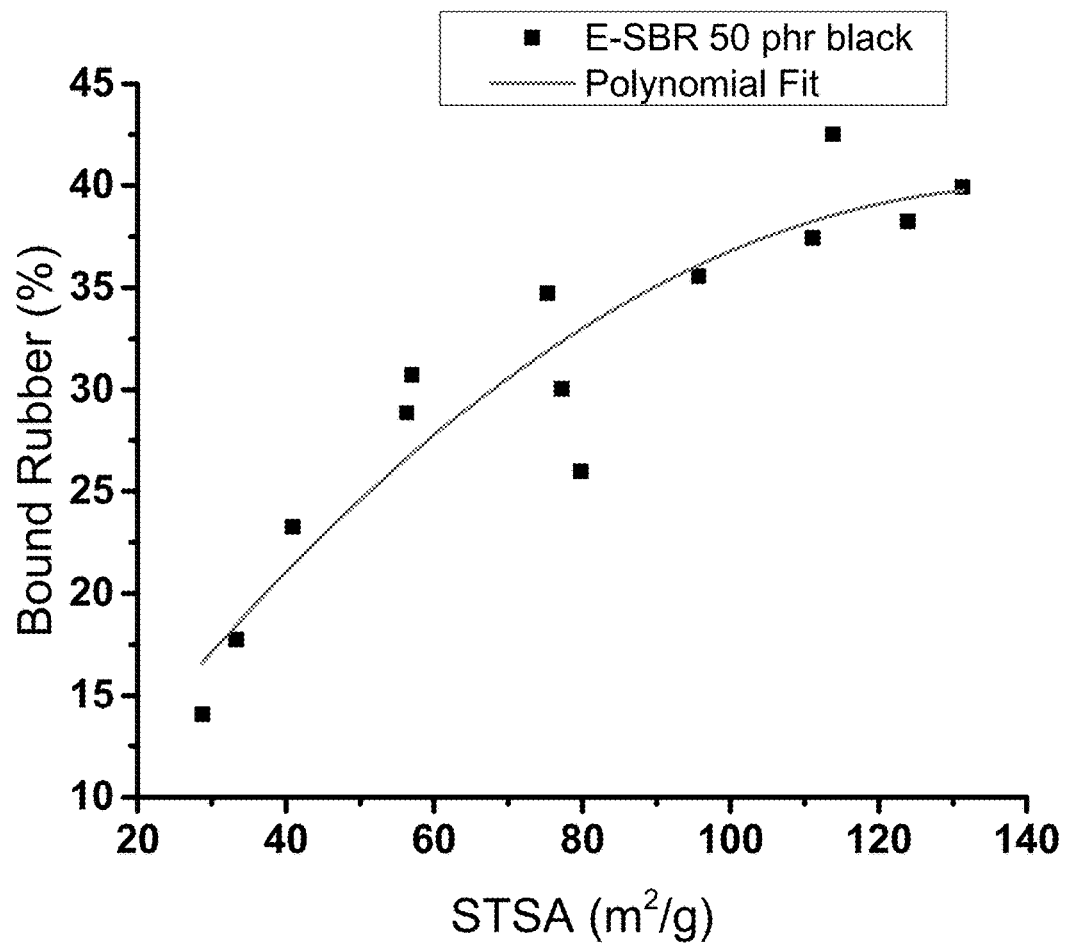
FIG. 3 is a chart showing surface area versus bound rubber for an evaluation of the carbon black product of the present disclosure relative to other types of carbon black, for purposes of determining a polymer interaction coefficient.
Figure 4:
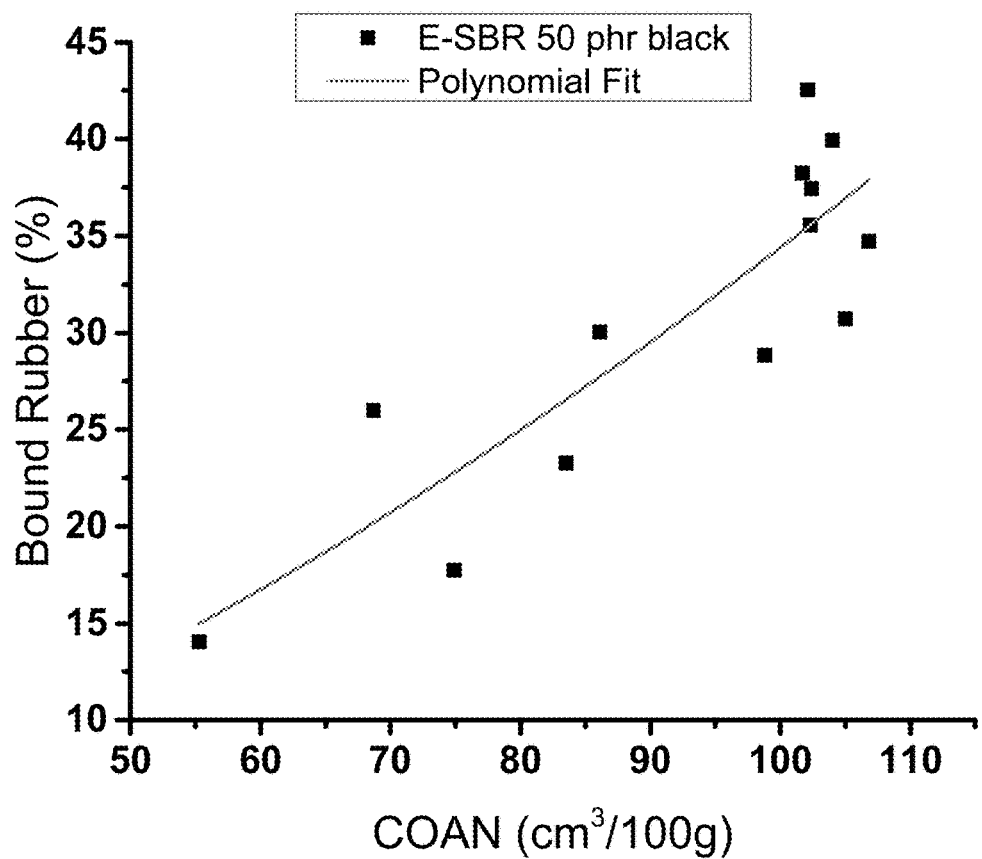
FIG. 4 is a chart showing structure versus bound rubber for an evaluation of the carbon black product of the present disclosure relative to other types of carbon black, for purposes of determining a polymer interaction coefficient.

Each of the carbon blacks in the evaluation, including the SR409 according to the present disclosure, were also measured for bound rubber as described hereinabove. The bound rubber percentage of each of the carbon blacks in the evaluation was charted relative to STSA surface area (FIG. 3) and COAN structure (FIG. 4). PIC measurements were then obtained by plotting grams of bound rubber versus grams of carbon black to look at the mass effect, or mg bound rubber versus $m^2$ of carbon black surface for the surface effect.

Figure 5:
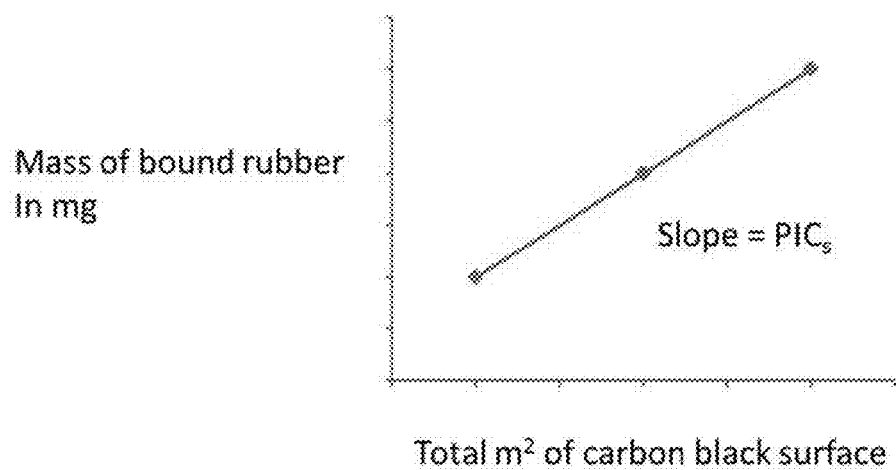
FIG. 5 is a chart illustrating a method for calculating a polymer interaction coefficient surface effect for a particular carbon black type, involving a plotting of mass of bound rubber against a total carbon black surface area and determining a slope, the slope being the polymer interaction coefficient surface effect.
Figure 6:
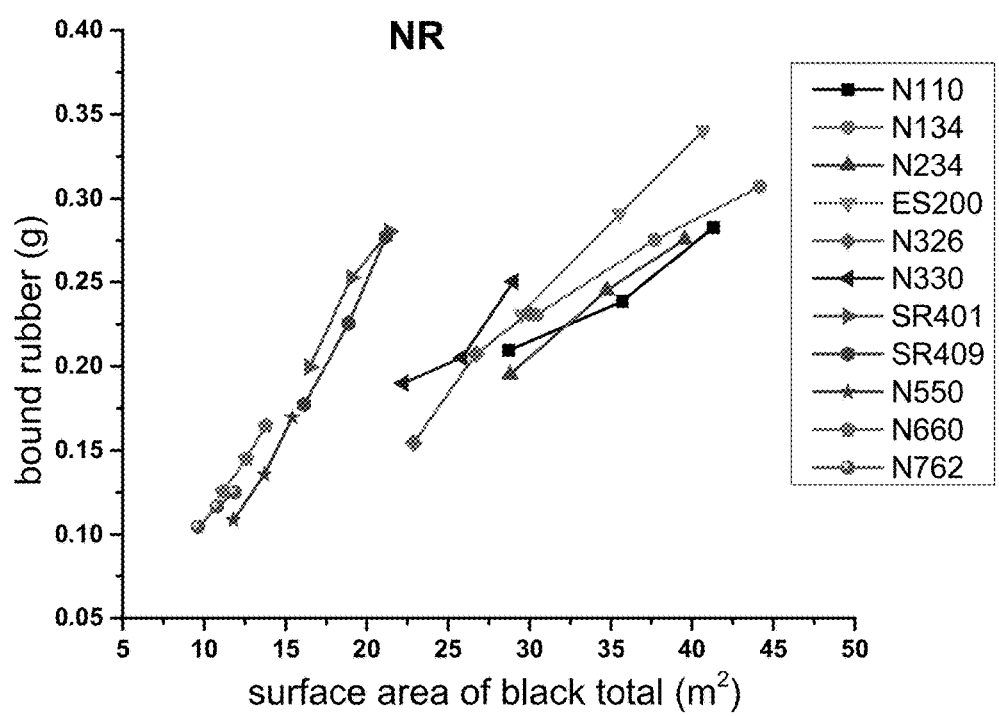
FIG. 6 is a chart showing the plots of mass of bound rubber against a total carbon black surface area for a multitude of carbon black types, including the carbon black product according to the present disclosure.

A polymer interaction coefficient surface effect ($PIC_s$) was generated for each of the evaluated carbon blacks as shown in FIG. 5. In FIG. 5, the mass of the bound rubber was charted in a scatter plot against the total carbon black surface area at the evaluated carbon black loadings. A numerical value for the $PIC_s$ was then determined by the slope of a best fit line superimposed on the scatter plot. Each of the scatter plots used to determine the $PIC_s$ for each of the evaluated carbon blacks is further depicted in FIG. 6.

Figure 7:
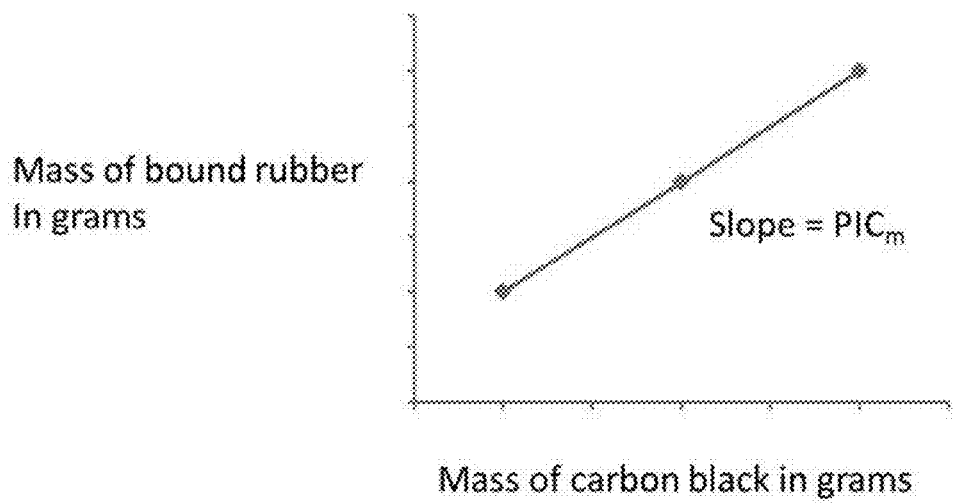
FIG. 7 is a chart illustrating a method for calculating a polymer interaction coefficient mass effect for a particular carbon black type, involving a plotting of mass of bound rubber against a total mass of the carbon black and determining a slope, the slope being the polymer interaction coefficient mass effect.

A polymer interaction coefficient mass effect ($PIC_m$) was also generated for reach of the evaluated carbon blacks as shown in FIG. 7. In FIG. 7, the mass of the bound rubber was charted in a scatter plot against the total mass of carbon black at the evaluated carbon black loadings. A numerical value for the $PIC_m$ was then determined by the slope of a best fit line superimposed on the scatter plot. Each of the scatter plots used to determine the $PIC_m$ for each of the evaluated carbon blacks is further depicted in FIG. 8.

FIG. 9 shows the $PIC_m$ for the SR409 carbon black of the present disclosure relative to the SR401, the N330, and the N550 carbon blacks also evaluated, in a natural rubber formulation. The $PIC_m$ for the SR409 carbon black of the present disclosure was shown to be significantly greater than the $PIC_m$ for the SR401, N330, and N550 carbon blacks. In particular, using a natural rubber formulation, the $PIC_m$ is between about 100 and 120, and more particularly between about 105 and 115, and most particularly about 110. One of ordinary skill in the art should appreciate that the $PIC_m$ may vary depending on the type of polymer used in the formulation.

It should be understood that these PIC test results indicate an increased polymer filler interaction for SR409 relative to the other carbon black types. Surprisingly, the SR409 carbon black has a higher polymer filler interaction in comparison to SR401 carbon black, despite also having a lower structure. Thus, the SR409 carbon black of the present disclosure is particularly useful as a gap black in polymer formulations for articles such as tires.

While certain representative embodiments and details have been shown for purposes of illustrating the invention, it will be apparent to those skilled in the art that various changes may be made without departing from the scope of the disclosure, which is further described in the following appended claims.

What is claimed is:

1. A carbon black product comprising aggregates of carbon black characterized as having an OAN of between 139 and 149 ml/100 g, a COAN of between 95 and 105 ml/100 g, an iodine adsorption number $I_2$ No of between 52 and 62 mg/g, and a multipoint nitrogen adsorption $N_2SA$ of between 54 and 64 $m^2/g$, wherein the aggregates of carbon black are further characterized by an ASD Mode greater than 0.145 μm and an ASD FWHM greater than 0.110 μm.

2. A polymer formulation, comprising:
a quantity of polymer; and
a quantity of carbon black product comprising aggregates of carbon black characterized as having an OAN of between 139 and 149 ml/100 g, a COAN of between 95 and 105 ml/100 g, an iodine adsorption number $I_2$ No of between 52 and 62 mg/g, and a multipoint nitrogen adsorption $N_2SA$ of between 54 and 64 $m^2/g$, wherein the aggregates of carbon black are further characterized by an ASD Mode greater than 0.145 μm and an ASD FWHM greater than 0.110 μm.

3. An article comprising the polymer formulation of claim 2.

4. A tire manufactured with the polymer formulation of claim 2.

5. The tire of claim 4, comprising a sidewall manufactured with the polymer formulation.

6. The tire of claim 4, comprising a tread manufactured with the polymer formulation.

7. The tire of claim 4, wherein the polymer includes one of styrene butadiene rubber, butadiene rubber, natural rubber, polyisoprene rubber, butyl rubber, and combinations thereof.

8. The carbon back product of claim 1, wherein the ASD Mode is between 0.145 μm and 0.165 μm, and the ASD FWHM is between 0.110 μm and 0.150 μm.

9. The polymer formulation of claim 2, wherein the ASD Mode is between 0.145 μm and 0.165 μm, and the ASD FWHM is between 0.110 μm and 0.150 μm.

10. The carbon back product of claim 1, wherein the ASD Mode is between 0.150 μm and 0.160 μm, and the ASD FWHM is between 0.120 μm and 0.140 μm.

11. The polymer formulation of claim 2, wherein the ASD Mode is between 0.150 μm and 0.160 μm, and the ASD FWHM is between 0.120 μm and 0.140 μm.

* * * * *